(12) United States Patent
Paiement et al.

(10) Patent No.: US 11,470,415 B2
(45) Date of Patent: Oct. 11, 2022

(54) EXTERNAL AUDIO ENHANCEMENT VIA SITUATIONAL DETECTION MODELS FOR WEARABLE AUDIO DEVICES

(71) Applicant: AT&T Intellectual Property I, L.P., Atlanta, GA (US)

(72) Inventors: Jean-Francois Paiement, Sausalito, CA (US); David Crawford Gibbon, Lincroft, NJ (US); Tan Xu, Bridgewater, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 135 days.

(21) Appl. No.: 17/101,501

(22) Filed: Nov. 23, 2020

(65) Prior Publication Data

US 2022/0167075 A1    May 26, 2022

(51) Int. Cl.
*H04R 25/00* (2006.01)
*H04R 1/10* (2006.01)
*G06F 3/01* (2006.01)
*G10L 17/06* (2013.01)

(52) U.S. Cl.
CPC ........... *H04R 1/1041* (2013.01); *G06F 3/011* (2013.01); *G10L 17/06* (2013.01); *H04R 1/1091* (2013.01)

(58) Field of Classification Search
CPC ..... H04R 1/1041; H04R 1/1091; G06F 3/011; G10L 17/06
See application file for complete search history.

(56) References Cited

U.S. PATENT DOCUMENTS

| | | | |
|---|---|---|---|
| 9,324,322 B1* | 4/2016 | Torok | H04R 3/02 |
| 9,699,583 B1* | 7/2017 | Lyren | H04S 7/303 |
| 10,325,591 B1 | 6/2019 | Pogue et al. | |
| 11,128,636 B1* | 9/2021 | Jorasch | G06F 3/015 |
| 2019/0068662 A1 | 2/2019 | Anders et al. | |
| 2022/0021985 A1* | 1/2022 | Wexler | G10L 25/51 |

* cited by examiner

*Primary Examiner* — Simon King (57) ABSTRACT

A processing system including at least one processor may capture data from a sensor comprising a microphone of a wearable device, the data comprising external audio data captured via the microphone, determine first audio data a first audio source in the external audio data, apply the first audio data to a situational detection model, and detect a first situation via the first situational detection model. The processing system may then modify, in response to detecting the first situation via the first situational detection model, the external audio data via a change to the first audio data in the external audio data to generate a modified audio data, in accordance with at least a first audio adjustment corresponding to the first situational detection model, where the modifying comprises increasing or decreasing a volume of the first audio data, and present the modified audio data via an earphone of the wearable device.

20 Claims, 3 Drawing Sheets

EXTERNAL AUDIO ENHANCEMENT VIA SITUATIONAL DETECTION MODELS FOR WEARABLE AUDIO DEVICES

The present disclosure relates to wearable audio devices, and more particularly to apparatuses, non-transitory computer-readable media, and methods for modifying external audio data in response to detecting a situation via a situation detection model based upon sensor data comprising the external audio data.

BACKGROUND

Wearable audio technologies have evolved from portable cassette players to portable compact disc players, and so forth, e.g., in conjunction with earphones and/or a headset for personal listening. More recently, the use of mobile phones as a media source, either for stored music or video, or streaming music or video, has become ubiquitous; again, often in conjunction with earphones, earbuds, or a headset. In addition, earphones, earbuds, or headsets with complementary microphones are often used in conjunction with mobile phones for hands-free calling. Short range wireless technologies further enable the paring of earpieces and/or headsets with mobile phones, portable media players, or the like, without the use of plugs and wires. As a result of these conveniences and technological advancements, users are ever more involved in the use of portable devices with immersive audio.

SUMMARY

Apparatuses, computer-readable media, and methods for modifying external audio data in response to detecting a situation via a situation detection model based upon sensor data comprising the external audio data are disclosed. For example, a processing system including at least one processor may capture sensor data from at least one sensor, where the at least one sensor comprises at least one microphone of a wearable device, e.g., a headset, and where the sensor data captured from the at least one sensor comprises external audio data captured via the at least one microphone. The processing system may next determine first audio data of at least a first audio source in the external audio data captured via the at least one microphone, apply at least the first audio data to at least one situational detection model, where a first situational detection model of the at least one situational detection model is to detect a respective situation based upon at least the first audio data, and detect a first situation via the first situational detection model of the at least one situational detection model. The processing system may then modify, in response to the detecting the first situation via the first situational detection model, the external audio data via a change to the first audio data in the external audio data to generate a modified audio data, where the modifying is in accordance with at least a first audio adjustment corresponding to the first situational detection model, where the modifying comprises increasing or decreasing a volume of the first audio data, and present the modified audio data via at least one earphone of the wearable device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Apparatuses, computer-readable media, and methods for modifying external audio data in response to detecting a situation via a situation detection model based upon sensor data comprising the external audio data are disclosed. For instance, examples of the present disclosure provide for "augmented audio reality" (ARR) experiences involving the use of wearable audio devices comprising earphones, earbuds, or headsets having one or more microphones to capture external audio from an environment. In one example, the wearable audio devices may be used in conjunction with various situational detection models to process sensor data including the external audio and/or other sensor data, such as video or images, and to detect various situations as defined by the situational detection models. The present disclosure may also include modifying the external audio data in accordance with modifications associated with respective situations, or situational detection models. For instance, external audio may be captured from one or more microphones positioned to capture audio from the environment (e.g., external from a user of the wearable device) and may be presented in an enhanced form via the earphones. As such, the perceivable audio at the user's ear(s) may be different from what would be perceived at the same location at the same time in the absence of the enhancement(s) provided by the present disclosure.

In one example, the present disclosure provides a personalized audio landscape to an user through the user's choices and in consideration of environmental conditions, with possible overrides of user choices (e.g., for certain situations that are universally applicable, such as emergencies). In one example, a wearable audio device of the present disclosure, or a portable computing device of a user that is connected to or otherwise paired with the wearable audio device may be configured to interact with network services. For instance, a network-based orchestrator having a centralized and/or distributed component (e.g., public and/or private cloud-based deployments, network edge-based deployments, etc.) may maintain user profiles, may maintain and apply situational detection models on a per-user basis in accordance with such user profiles, may maintain and apply universal/system-wide situational detection models that may be applicable to all users (e.g., for detecting emergency announcements or other types of dangerous situations, while being applied to per-user sensor/audio data streams/feeds), and so forth.

In one example, the present disclosure may detect a situation comprising the presence of a particular individual and may enhance (or diminish) the voice of the individual as may be extracted from the external audio captured from the environment via at least one microphone of a user's wearable audio device. In one example, the present disclosure may detect a situation comprising a group-based communication, e.g., where several friends or a team is together in a crowd and would like to better hear each other. In such case, the voices of group members may be enhanced while other sources in the same external audio may be diminished by presenting a modified external audio at the user's headset. Thus, for example, a group member or individual may attempt to talk to the user from the other side of a room, and would generally be hard to hear, but instead, his or her voice may be picked up out of the environment, detected via a situational detection model, and enhanced, while other sounds may be diminished at the user's headset. For instance, in one example, situational detection models may be created, maintained, and utilized for detecting voices of specific individuals (e.g., one model for each known individual). In one example, a user's friend(s), relative(s), co-worker(s), and/or group members may provide samples of their respective voices, and/or may have trained models for their own voices, which may be provided to the user and to others on a voluntary basis (e.g., for deployment on the user's headset or other mobile computing devices and/or by a network-based orchestrator in conjunction with the user's device(s)). Thus, in one embodiment, the situational detection models are not intended to address general background noises such as noise cancellation algorithms, which are not specific to a known human audio source that is known to the user. In an alternative embodiment, the situational detection models may be trained with human speech of "unknown" individuals to the user, e.g., flight attendants, airplane pilots, train conductors, bus drivers, and so on. These "unknown" individuals may have only temporary contacts with the user under a given situation but they may serve pivotal functions vital to the safety of the user under the given situation. As such, samples of their respective voices can be downloaded from a publicly accessible source (e.g., an application server that is deployed within an airport, a train or ship terminal, or a bus station, or that is directly deployed on a plane, ship, train or bus), e.g., directly from an aircraft during boarding, a ship during boarding, from a train during boarding, from a bus during boarding (e.g., related to crew members serving the current flight, the current ship, the current train, the current bus, etc.) that will allow the situational detection models to be dynamically trained to detect their specific voices on a temporary basis, e.g., for the duration of the travel. Voice samples of these crew members can be loaded onto the pertinent respective application servers based on their work schedules. In one embodiment, when the travel is completed, the situational detection models will revert back to a state prior to the start of the travel, thereby eliminating the need to detect such specific voices. Thus, unknown individuals can be elevated to known individuals on a temporary basis for the situational detection models. The reversion of the situational detection models can be done by receiving a specific input from the user indicating that the travel is completed or the method may simply detect that the user arriving at a particular location, e.g., at home, at an office, at a particular lodging location, etc., e.g., via GPS coordinates.

In another example, a user may be listening to music or may have a noise-cancelling feature activated on the wearable audio device, but a situation of a safety announcement may be detected in accordance with a "safety announcement" situational detection model, and the associated audio (e.g., the safety announcement) may be let through. In another example, the user may simply be in a noisy environment and when a safety message is detected, the safety message may be enhanced. In one example, other sounds may additionally be diminished (e.g., a noise-cancellation/noise-reduction may be activated). In one example, the user's device(s) and/or network-based orchestrator may blend sounds from within the captured external audio at different levels, ratios/percentages or the like. For instance, while enhancing a safety message and diminishing other external audio, it may still be desirable to have a companion's voice allowed through and/or enhanced. For example, in response to or during the safety announcement, the companion may say "let's get out of here." In such case, it may be preferable that the user hears the companion's voice in addition to the safety announcement. In such case, rules regarding the blending and mixing of individual audio sources may be applied in accordance with user preferences (e.g., by user profile and/or as manually selected for application at a given time). Alternatively, or in addition, the blending and mixing may be in accordance with universal/system-wide rules to be applied across a user base. For instance, a network operator, or an operator of a processing system of the present disclosure may select that an emergency announcement may be presented at no less than 50% of full volume, and that no other audio sources may be presented at more than 70% of the volume at which the safety announcement is presented.

In still another example, a user may be in a room listening to music, while at the same time another person may be trying to talk to the user and there may be a television playing. In such an example, the present disclosure may seek to blend in more of one audio source and/or exclude more of a different audio source. For instance, the present disclosure may detect a focus of a user's attention based upon external audio data and/or visual data captured from the environment from the user's wearable audio device. In one example, the blending may be based upon the user's profile or preferences, which could be subject to override, as noted above. For instance, the user may look at the television, and the sound from the television may predominate instead of the music. However, if the user closes his or her eyes or looks away, the music may predominate. Nevertheless, if the other person in the room says "Hey! Dinner is ready," this sound may be allowed to predominate and override other blending logic. Similarly, if the user looks at the other person instead of the television, the other person's voice may be enhanced, while other sounds, such as the television or the music, may be diminished (or not enhanced).

In this regard, it should be noted that the wearable audio device may include additional sensors, such as at least one camera to capture image and/or video from which a user's focus, or attention may be determined. In such an example, the situational detection models of the present disclosure may additionally take visual data as input(s) and may generate outputs in further consideration of such additional input(s). In another example, the device may include a small, intermittent laser (e.g. light detection and ranging (LiDAR)) such that a three dimensional characterization of an entire room or other space (or only the objects immediately in front of the user) can be detected and utilized to determine proximity, attention, or relevance to the user's context. In another example, a less precise audio sensor based on sonar or infrared reflections may similarly be utilized to detect objects and gaze or the movement of those objects proximal to the user. In addition, in one example, the wearable audio device may comprise at least one directional microphone such that audio of a particular audio source (e.g., in a direction that the user is facing) may be detected and segregated from other ambient audios captured from the environment via the same or a different microphone of the wearable device. It should be noted that in one example, the present disclosure may include situational detection models to detect a type of audio source (e.g., to positively identify that the user is looking at a "television") and may better determine the portion of the external audio data that is from the television as an audio source. However, in another example, a situational detection model may be trained to just determine which audio may be important, so as to enhance the particular audio source. For instance, the wearable device and/or an orchestrator may simply identify multiple possible unique audio sources in the external audio captured via the at least one microphone (e.g., a directional microphone), and may determine that one of the unique audio source should be enhanced or diminished based upon the direction of sound arrival.

It should also be noted that audio from a particular audio source may also be diminished and/or blocked based upon a determined focus of the user. For instance, a user may look toward an airplane and may desire that the sound be blocked. Such a determination may be based upon a user/profile and or inferred from the nature of the audio source. For instance, a situation detection model may be to determine a situation of "airplane" and/or or "airplane noise," in which case such a situational detection model may have a system-wide association with the corresponding audio modification of "diminish/block." In another example, the type of audio modification may be different depending on the situation detected. For example, a human voice in a safety message or spoken utterance from a friend may simply be amplified. However, situational audio like an explosion, clapping, or a whistle may be modified in a way that non-uniformly amplifies the audio to correspondingly focus on the low-frequency (explosion), mid-frequency (clapping), and high frequency (whistle) components of the original sounds. These modifications change the characteristics of the audio to draw specific, pointed attention from the user as needed. In yet another example, the modification itself can trigger a different event this is better understood by the user. For example, the automated tones preceding a safety announcement may trigger an automated recording "your attention please," the sounds of a fight or a screaming child may trigger a bell-based klaxon, or the spoken word "stop" in a language foreign to the user may trigger the word "stop" in the user's native language. Each of these modifications involve a translation or mapping to another audio sound that can be learned or specifically chosen by the user for each detected situation as a preferred response.

In one example, situational detection models may comprise artificial intelligence (AI)/machine-learning (ML) based models that are trained and configured to take sensor data from a wearable device (including at least external audio data) as inputs/independent variables, and to output a decision or score as to whether a situation is present/detected. In one example, each situational detection model may be able to detect a particular semantic content, such as "breaking glass," "car accident," "car," "airplane," "train," "sailboat," "television," "baseball game," "fighting," "classroom," and so forth. Thus, each situational detection model may comprise a "signature" for semantic content. In accordance with the present disclosure, a situational detection model may also be a voice and/or a presence of a known individual. For instance, the present disclosure may identify a user's friends, spouse, children, co-workers, team members, etc. via situational detection models to detect respective voices of such individuals and/or the faces of such individuals, etc.

In accordance with the present disclosure, "situations" are formalized. For example, signatures (e.g., machine learning models) characterizing the corpus of detectable situations may be stored along with corresponding audio modifications in a database (as well as an identifier such that a user may select to activate/deactivate a particular situational detection model and/or to associated particular audio modifications with particular situations). Some situation detection models may be stored as part of a user profile, specific to a particular user, while other situation detection models may be stored and made available for situation detection for multiple users and their respective wearable devices.

In accordance with the present disclosure, a situational detection model, or signature, may be learned/trained based upon inputs of low-level audio features such as: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Additional audio features may also include high-level features, such as: words and phrases. For instance, one example may utilize speech recognition pre-processing to obtain an audio transcript and to rely upon various keywords or phrases as data points. For example, a situation detection model for a train-specific "safety announcement" may detect specific words of "please exit the train immediately" or a substantially similar phrase. However, another situation detection model may be trained to more coarsely detect audio that is determined to sound like a loudspeaker on a train car or train platform, without specific learning of particular words and/or phrases. The situational detection model may thus depend upon the audio preprocessing services that are available and/or in use (e.g., the "features" that are available for selection in comprising a signature and for detection of a situation, e.g., a semantic content), the nature of the situation, or semantic content (e.g., "shouting" or "crying of a child" versus "tree rustling," "ball bouncing," "running steps", etc.), and so forth. As noted above, a situation detection model may be for a voice and/or a presence of a known individual. In such case, the situation detection model for detecting a particular known individual may be trained on labeled training data comprising audio samples of a voice of the known individual.

As noted above, some examples may include additional sensor data (e.g., images and/or video) for detecting different situations. In such cases, types of features that may be used to detect various types of situations in conjunction with audio data, may include visual features from images or video. For instance, the visual features may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. In one example, an image salience detection process may be applied in advance of one or more situation detection models, e.g., applying an image salience model and then perform a situational detection over the "salient" portion of the image(s) (and in one example, in conjunction with corresponding external audio data). Thus, in one example, visual features may also include a recognized object, a length to width ratio of an object, a velocity of an object estimated from a sequence of images (e.g., video frames), and so forth. For instance, a "dangerous situation"

of a "brawl" may be detected from audio data containing sounds of commotion, fighting, yelling, screaming, scuffling, etc. in addition to visual data which shows chaotic fighting or violent or inappropriate behavior among a significant number of people.

In accordance with the present disclosure, a situational detection model may comprise a machine learning model (MLM) that is trained based upon the plurality of features available to the system (e.g., a "feature space"). For instance, one or more positive examples for a situation, or semantic content, may be applied to a machine learning algorithm (MLA) to generate the signature (e.g., a MLM). In one example, the MLM may comprise the average features representing the positive examples for a situation in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on.

In one example, a trained situation detection model may be configured to process those features which are determined to be the most distinguishing features of the associated situation, e.g., those features which are quantitatively the most different from what is considered statistically normal or average from other situations that may be detected via a same system, e.g., the top 20 features, the top 50 features, etc. In one example, a situation detection model (e.g., a MLM) may be deployed in a wearable audio device, in a portable/mobile computing device coupled to the wearable audio device, and/or in a network-based processing system to process sensor data from one or more sensor sources (e.g., microphones, and in one example, cameras and/or other sensors), and to identify patterns in the features of the sensor data that match the situation detection model(s). In one example, a match may be determined using any of the audio features and/or visual features mentioned above, e.g., and further depending upon the weights, coefficients, etc. of the particular type of MLM. For instance, a match may be determined when there is a threshold measure of similarity among the features of the sensor data streams(s) and the semantic content signature. In one example, the media streams(s) may be analyzed using a time-based sliding window, extracting features, and comparing the features to a signature comprising the situation detection model. For instance, in one example, a situation detection model may comprise a feature vector representative of a particular sound, while in other examples, a situation detection model may comprise a vector or set of weights to apply to input features extracted from the captured external audio, and/or images, video, etc.

As noted above, a situation detection model may be for a voice and/or a presence of a known individual. In examples in which visual data may be used as an alternative to or in conjunction with audio data to identify an individual, in one example, situation detection models may comprise eigenfaces of known individuals. Alternatively, or in addition, facial recognition may comprise a preprocessing step, where a result of a detected face of a known individual may comprise an additional input to a situational detection model For instance, an eigenface, or feature vector, representing a face of a particular known individuals may be trained from an image or video library comprising a cross-section of images or video of the known individual (e.g., in various gestures, expressions, poses, lighting conditions, etc.). In one example, a situation detection model of the present disclosure may further be specified to detecting a particular type of facial expression of a known individual. For instance, a user may personalize settings such that voices of other individuals are generally diminished while the user is able to listen to (and watch) a television program. However, if the user is facing a known individual who is speaking and has a particular facial expression that is assigned to a particular audio modification of "enhance," then the volume of the voice of the known individual may be increased. For example, if an output of a situation detection model indicates that a known individual is speaking, and that the known individual has a facial expression of "anger," then the voice of the known individual may be enhanced via the earpiece(s) of the user's wearable audio device (and/or the other sounds, such as the sound of the television program, may be diminished).

In some examples, audio feature extraction and/or audio source separation may be efficiently performed by the wearable device and/or by a paired mobile computing device. For instance, the wearable device or a paired mobile computing device may perform audio signal processing to separate different audio sources (or tracks) from each other within the same captured external audio. In one example, the signal separation may comprise a blind signal separation. However, in another example, there may be some information about which signals may be expected. For instance, a user device may have a situation detection model that is active with respect to other members of a conversational group, and thus, the wearable device or the paired mobile computing device may perform signal separation with some bias as to expectations of possible audio sources (e.g., at least the other group members for which known detection models are in use). For example, as stated above, a facial recognition process may precede application of sensor data inputs to one or more situational detection models. In one example, a wearable audio device or a paired mobile computing device of the user may apply various filtering and pre-processing to the entire captured external audio, or to individual tracks, such as deconvolution, noise reduction filtering (e.g., low pass filtering and/or high pass filtering), and so forth. In one example, one or more situational detection models may be applied by the wearable audio device and/or by a paired mobile computing device locally. Alternatively, or in addition, the wearable audio device and/or or a paired mobile computing device may process just enough to know which audio may be important so as to enhance (or diminish) and/or to send to orchestrator. In one example, a reduced amount of audio information may be sent over the network to an orchestrator, such as a digitally sampled representations of one or more tracks from the captured audio, tracks that are identified as human, or speech, for example, and so on.

In one example, the present disclosure may learn a user's preferences and habits with respect to various audio modifications, and may update a user's profile which may indicate which situation detection models should be activated and at which times, as well as the corresponding audio modifications to apply in response to the detection of various situations. For instance, over time, examples of the present disclosure may learn to include or exclude audio elements based upon user interests determined from camera/gaze input, based on preset known interests or habits, etc. (e.g., the processing system may learn that a user typically responds to person A, but typically ignores person B). In one example, a user may have a user profile with rules that determine which situation detection models are to be active, and the corresponding audio modifications, on a per-location basis, either by GPS coordinates, or by detection of proximity to particular beacons, routers, etc.

Unlike video and location services, audio playback and capture has remained a largely individual device or personal functionality. However, examples of the present disclosure provide the ability for audio input and outputs to be orchestrated and distributed via a local and/or a network-based service to provide several additional user experiences. Specifically, with a number of audio sources available in the same audio landscape that a user may be interested in, the present discourse may prioritize that content while not ignoring specific user needs (e.g., local conversations) or safety or other critical announcements (e.g., train arrival or gate changes for a flight, etc.) should be available to complement current "break-in" methods that disrupt user experiences. Spatial localization from proximal audio (e.g., device microphones) or directional gaze may be utilized to improve AI/ML decisions as to which audio source(s) a user is interested in. Finally, personalized and group-based communication capabilities accommodating individuals close-by and further away (e.g., on the other side of a crowded room) is underserved with current audio. Specifically, in busy environments (e.g., offices, parties, etc.) signal separation and selection methods are overly simplistic whereas with some audio processing the experience can be dramatically improved. In addition, examples of the present disclosure also provide improvements to conventional hearing aid/hearing assistance devices which tend to simply amplify all sounds other than what is clearly noise. These and other aspects of the present disclosure are discussed in greater detail below in connection with the examples of FIGS. 1-3.

Figure 1:
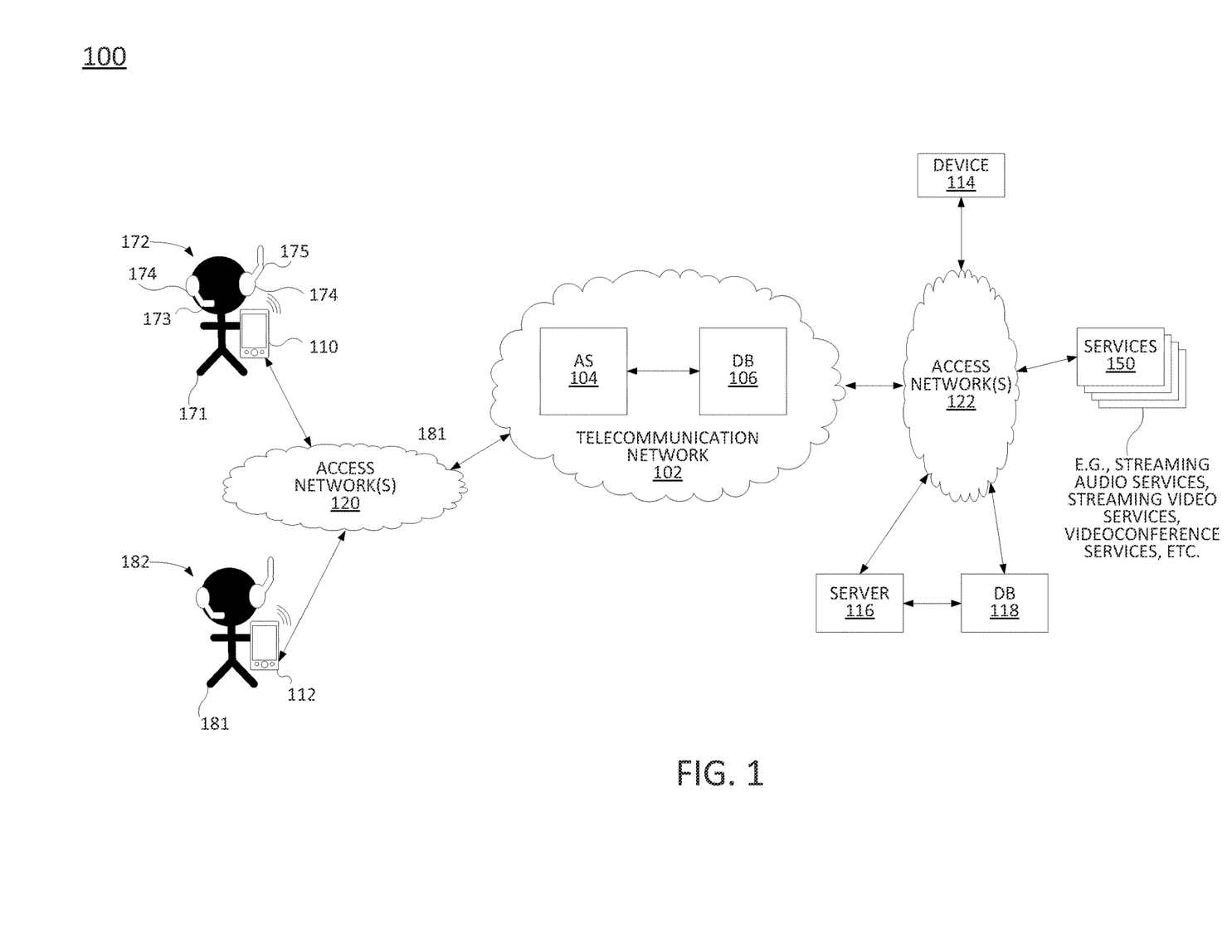
FIG. 1 illustrates an example network or system related to the present disclosure.

To further aid in understanding the present disclosure, FIG. 1 illustrates an example system 100 in which examples of the present disclosure for modifying external audio data in response to detecting a situation via a situation detection model based upon sensor data comprising the external audio data may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a telecommunication network 102. The telecommunication network 102 may be in communication with one or more access networks 120 and 122, and the Internet (not shown). In one example, telecommunication network 102 may combine core network components of a cellular network with components of a triple play service network; where triple-play services include telephone services, Internet/data services and television services to subscribers. For example, telecommunication network 102 may functionally comprise a fixed mobile convergence (FMC) network, e.g., an IP Multimedia Subsystem (IMS) network. In addition, telecommunication network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 102 may further comprise a broadcast television network, e.g., a traditional cable provider network or an Internet Protocol Television (IPTV) network, as well as an Internet Service Provider (ISP) network. In one example, telecommunication network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute for Electrical and Electronics Engineers (IEEE) 802.11/Wi-Fi network and the like), cellular access networks, $3^{rd}$ party networks, and the like. For example, the operator of telecommunication network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the telecommunication network 102 may be operated by a telecommunication network service provider. The telecommunication network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114, server 116, database (DB 118), services 150 (e.g., a plurality of servers hosting services), and so forth. Access networks 120 and 122 may transmit and receive communications between devices 110, 112, and 114, between devices 110, 112, and 114, and server 116 and/or database (DB) 118, services 150, application server (AS) 104 and/or database (DB) 106, other components of telecommunication network 102, devices reachable via the Internet in general, and so forth. In one example, each of the devices 110, 112, and 114 may comprise any single device or combination of devices that may comprise a user endpoint device and/or customer premises equipment (CPE). For example, the devices 110, 112, and 114 may each comprise a mobile device, a cellular smart phone, a laptop, a tablet computer, a desktop computer, an application server, a bank or cluster of such devices, and the like. Alternatively, or in addition, devices 110, 112, and 114 may each comprise a home gateway, a router, or any combination thereof, and so forth. Services 150 may comprise various types of services as described herein, e.g., streaming audio or streaming video services, videoconferencing service, and so on.

In the example of FIG. 1, device 110 may be associated with a user 171 who may be a user of a situational detection audio modification service as described herein. In the example of FIG. 1, access networks 120 may also be in communication with a headset 172 of user 171, e.g., directly or via device 110. For instance, the headset 172 may communicate with various network connected devices via infrastructure of access networks 120 (such as base stations, wireless routers, etc.) via IEEE 802.11 based communications (e.g., "Wi-Fi"), cellular communications, etc. In other words, headset 172 may include antenna(s), transceiver(s), and other components for cellular and/or non-cellular wireless communications. Alternatively, or in addition, headset 172 may be paired with device 110, e.g., via IEEE 802.11 based communications, IEEE 802.15 based communications (e.g., "Bluetooth", "ZigBee", etc.), and so forth), or via a wired connection (e.g., a cord and plug), and may be used to interact with other network-connected devices via device 110. As just one example, user 171 may cause a voice call to be established between device 110 and device 114, and the user 171 may participate in the call via speaker(s)/earpiece(s) 174 and user microphone 173 of the headset 172. In accordance with the present disclosure, headset 172 also includes at least one external microphone, e.g., microphone 175, to capture external audio, or ambient audio data from an environment surrounding user 171 and the headset 172. In one example, the microphone 175 may comprise a directional microphone (e.g., with a disproportionate gain in a particular direction or range (e.g., +20 dB or more over an angle of no greater than 180 degrees, 120 degrees, etc. averaged over a range of frequencies as compared to the gain for sounds arriving from other directions, +30 dB averaged over a range of frequencies for sounds arriving along a front center line as compared to a rear center line, or the like). It should be noted that microphone 175 is specifically for capturing external audio. In other words, the microphone 175 is not for capturing the voice of user 171, but is for all other external sounds.

Access networks 120 may also be similarly in communication with a headset 182 of user 181, e.g., directly or via device 112. Headset 182 may be similarly equipped as headset 172, e.g., including earphones, an external microphone (and in one example, a user microphone), and so on. In one example, either or both of headsets 172 and 182 may comprise an application for a situational detection audio modification service, as described herein. In another example, either or both of devices 110 and 112 may comprise an application for a situational detection audio modification service, as described herein. For instance, as discussed above, in one example, a wearable device (e.g., headset 172 and/or headset 182) or a paired mobile computing device (e.g., device 110 and/or device 112) may be configured to apply various situational detection models to sensor data inputs in order to determine various situations and to implement modifications to external audio data in accordance with the situations that are detected.

Figure 2:
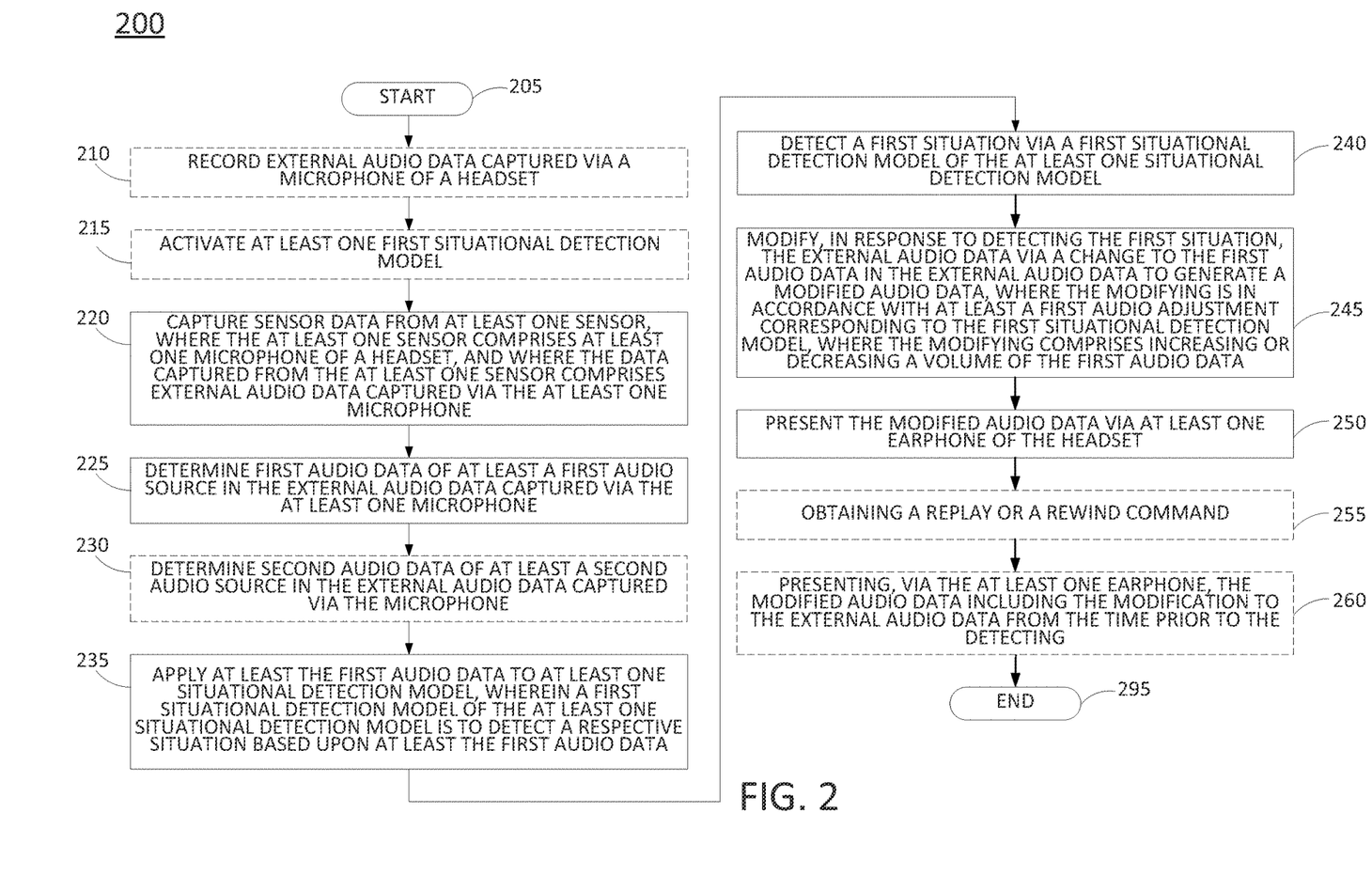
FIG. 2 illustrates a flowchart of an example method for modifying external audio data in response to detecting a situation via a situation detection model based upon sensor data comprising the external audio data.
Figure 3:
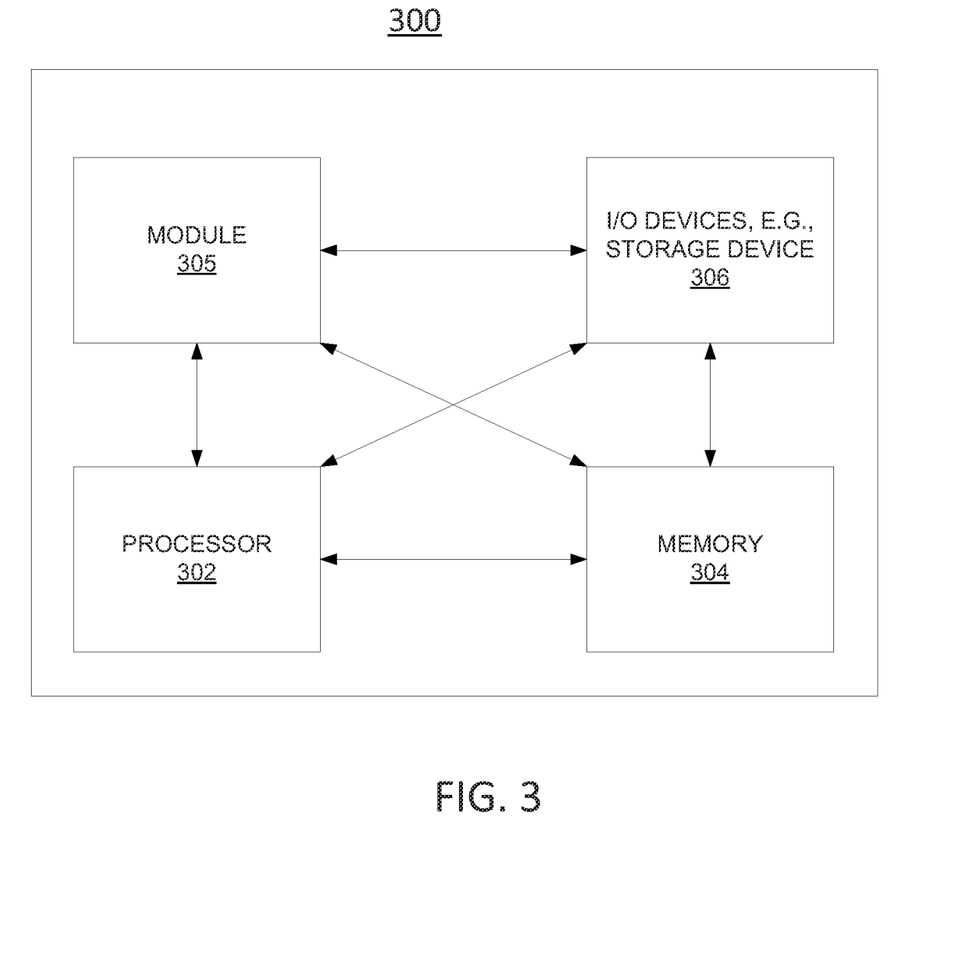
FIG. 3 illustrates a high-level block diagram of a computing device specially programmed to perform the functions described herein.

In this regard, it should be noted that any one of headsets 172 or 182, or devices 110 or 112 may comprise a computing system, such as computing system 300 depicted in FIG. 3, and may be configured to provide one or more operations or functions for modifying external audio data in response to detecting a situation via a situation detection model based upon sensor data comprising the external audio data, as described herein. For instance, an example method for modifying external audio data in response to detecting a situation via a situation detection model based upon sensor data comprising the external audio data is illustrated in FIG. 2 and described in greater detail below.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

As noted above, in one example, a wearable audio device or a paired mobile computing device may also interact with a network-based processing system, or "orchestrator" for a situational detection audio modification service. Thus, for example, as illustrated in FIG. 1, the access networks 122 may also be in communication with a server 116, e.g., an orchestrator for a situational detection audio modification service. In accordance with the present disclosure, server 116 may comprise a computing system or server, such as computing system 300 depicted in FIG. 3, and may be configured to provide one or more operations or functions for modifying external audio data in response to detecting a situation via a situation detection model based upon sensor data comprising the external audio data, as described herein.

In one example, DB 118 may comprise a physical storage device integrated with server 116 (e.g., a database server), or attached or coupled to the server 116, to store various types of information in support of systems for modifying external audio data in response to detecting a situation via a situation detection model based upon sensor data comprising the external audio data (e.g., a situational detection audio modification service). For example, DB 118 may store situational detection models (for both per-user deployment and for system-wide multi-user deployment), speech-to-text conversion models, natural language understanding (NLU) pipeline(s) (e.g., user-specific and/or non-user specific), user profiles and/or user preferences, user context information (e.g., location, status (such as working/not working, do not disturb, on a work call, on a personal call, etc.)), and so forth that may be processed by server 116. DB 118 may also store programs, logic, or instructions that may be executed by server 116 for modifying external audio data in response to detecting a situation via a situation detection model based upon sensor data comprising the external audio data, as described herein.

In one example, server 116 may obtain training data and may train various situational detection models. For example, server 116 may obtain voice samples of user 181 to train a situational detection model to identify the voice of user 181.

In one example, the server 116 may also obtain images of a face of user 181 to further train the situational detection model in accordance with the facial image data as additional inputs to the model and/or to train a facial recognition preprocessing model. In another example, user 181 may have generated a situational detection model for himself/herself which may be provided to the server 116 for storage (e.g., in DB 118), for deployment and use, for providing to wearable device and/or mobile computing devices of other users for use in detecting user 181, and so forth. Similarly, server 116 may obtain labeled training and/or testing data which is indicative of various situations (or which comprise negative examples) and which may be used to train and generate various situational detection models associated with the various situations. In still another example, situational detection models may be generated via other devices or processing systems and provided/uploaded to server 116, e.g., for storage in DB 118, when completed and useable in production.

In one example, DB 118 may store situational detection models and their associated audio modifications/actions. In one example, where situational detection models may be used/reused by many users, different users' respective audio modifications may be stored on a per-user basis, and thus personalized for each user when deployed. In one example, DB 118 may store explicit user preferences or configurations that may be provided by users, e.g., specific rules to activate/deactivate certain situational detection models at different times of the day and/or days of the week, at particular locations (which may be detected by GPS receivers of the users' respective wearable audio devices or paired mobile computing devices, etc.), during particular events (e.g., while a user is on a scheduled work call according to a user's calendar application), and so on. In one example, server 116 may track each user's interactions and responses to automated system actions for various audio modifications, and may learn all or a portion of a user's preferences over time. For instance, if the server 116 automatically enhances certain sounds in accordance with a situational detection model, but the user provides an input to correct the action and/or to manually override the audio modification, server 116 may note the user's disagreement and may adapt the modifications over time. For example, for certain detected situations the user may still prefer a volume increase for one or more audio sources, but may prefer a lesser increased volume than the system may have selected.

In one example, server 116 may apply situation detection models to input sensor data that may be streamed from headsets 172 and 182 and/or devices 110 and 112. In another example, server 116 may provide situation detection models to headsets 172 and 182 and/or devices 110 and 112 for local application. For instance, users 171 and 181 may agree to participate in a conversation with enhanced audio for which the server 161 may provide a respective situation detection model for detecting user 171 to the device of user 181 (e.g., the headset 182 and/or the device 112), and a respective situation detection model for detecting user 181 to the device of user 171 (e.g., the headset 172 and/or the device 110). Thus, if and when users 171 and 181 may converse across a crowded room, their respective voices may be enhanced via the complementary device of their conversational partner. Similarly, server 116 may provide situation detection models to both of users 171 and 181 via respective devices e.g., the headset 172 and/or the device 110, and the headset 182 and/or the device 112) for detecting safety messages, or emergency announcements, for detecting other dangerous situations, e.g., car crash, gunshot, brawl, etc., and so on. In addition, server 116 may provide updated situation detection models from time to time, e.g., as the models are retrained with labeled feedback data and/or new training data.

In one example, a portion of situational detection models may be applied locally by headsets 172 and 182 and/or devices 110 and 112 for the respective users 171 and 181, while a portion of situational detection models may be applied by server 116 (e.g., a network-based processing system) with respect to the same inputs. For instance, more simplistic situational detection models, or those deemed most important by a user or a system operator may be deployed locally, while others may be deployed at server 116 and operate simultaneous with those operating locally at the users' devices. These and other aspects of the present disclosure are discussed in greater detail below in connection with the example of FIG. 2.

Although only a single server 116 and a single DB 118 are illustrated, it should be noted that any number of servers 116 or databases 118 may be deployed. In addition, server 116, DB 118, any of services 150, and so forth may comprise public or private cloud computing resources, e.g., one or more host devices/servers in one or more data centers to host virtual machines (VMs), containers, or the like comprising various functions, services, and so on.

In one example, telecommunication network 102 may also include an application server (AS) 104 and a database (DB) 106. In one example, AS 104 may perform the same or similar functions as server 116. Similarly, DB 106 may store the same or similar information as DB 118 (e.g., situational detection models (for both per-user deployment and for system-wide multi-user deployment), speech-to-text conversion models, user-specific and/or non-user specific NLU pipelines, user profiles and/or user preferences, user context information, and so forth, or instructions that may be executed by AS 104 and/or server 116 for modifying external audio data in response to detecting a situation via a situation detection model based upon sensor data comprising the external audio data, and so forth). For instance, telecommunication network 102 may provide a situational detection audio modification service to subscribers, e.g., in addition to television, phone, and/or other telecommunication services. In one example, AS 104, DB 106, server 116, and/or DB 118 may operate in a distributed and/or coordinated manner to perform various steps, functions, and/or operations described herein. In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of telecommunication network 102 and/or access networks 120 and 122 may comprise a content distribution network (CDN) having ingest servers, edge servers, and the like.

Similarly, although only two access networks 120 and 122 are shown, in other examples, access networks 120 and/or 122 may each comprise a plurality of different access networks that may interface with telecommunication network 102 independently or in a chained manner. For example, device 114 and server 116 may access telecommunication network 102 via different access networks, devices 110 and 112 and/or headsets 172 and 182 may access telecommunication network 102 via different access networks, and so forth. Thus, these and other modifications are all contemplated within the scope of the present disclosure.

FIG. 2 illustrates a flowchart of an example method 200 for modifying external audio data in response to detecting a situation via a situation detection model based upon sensor data comprising the external audio data. In one example, the method 200 is performed by a component of the system 100 of FIG. 1, such as by server 116, AS 104, device 110, device 112, headset 172, headset 182, and/or any one or more components thereof (e.g., a processor, or processors, performing operations stored in and loaded from a memory), or any of such components in conjunction with one or more other of such components (e.g., headset 172 in conjunction with a network-based orchestrator, such as server 116 or AS 104), and so forth. In one example, the steps, functions, or operations of method 200 may be performed by a computing device or system 300, and/or processor 302 as described in connection with FIG. 3 below. For instance, the computing device or system 300 may represent any one or more components of headset 172, headset 182, server 116, AS 104, device 110, device 112, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system.

The method 200 begins at step 205 and may proceed to optional step 210, optional step 215, or step 220.

In optional step 210, the processing system may record external audio data (e.g., from a time prior to the detecting at least a first situation via a first situational detection model). In one example, the processing system may comprise a headset, e.g., with at least one earpiece and at least one microphone to capture external audio (broadly a "wearable audio device"). In one example, the processing system may comprise a mobile computing device that may be connected to a headset/wearable audio device of the user (e.g., where the headset may not include its own computing and/or communication capabilities). In one example the processing system may be deployed in a telecommunication network, e.g., one or more servers deployed at a centralized location or distributed locations, deployed in one or more edge networks, etc., and/or may be deployed in public or private cloud infrastructure.

In optional step 215, the processing system may activate at least one situational detection model (e.g., at least a first situational detection model) in response to a user input. In one example, the user input may be a voice command, a command entered via keypad or touchscreen of a mobile computing device, etc. Alternatively, or in addition, the processing system may activate one or more situational detection models for the user in accordance with a user profile (e.g., user preferences and/or manual configurations), or a user profile in conjunction with user context information, such as location information of the user, time of day, day of week, and/or calendar information of the user, biometric information of the user, and so forth.

In one example, the first situational detection model is to detect a safety message. In another example, the first situational detection model is to detect a defined dangerous situation. In still another example, the at least one situational detection model may be to detect a voice of a first known individual. In one example, the at least one situational detection model further comprises a second situational detection model, where the second situational detection model is to detect a voice of at least a second known individual. For instance, the first known individual, the second known individual, and a user of the headset may be participants in a group-based communication. In other words, each of the plurality of situational detection models may be for identifying respective individuals of the team/group. Thus, in one example, optional step 215 may comprise activating the plurality of situational detection models for the group-based communication in accordance with at least one user input. In one example, the activation may be in response to inputs from a plurality of users (e.g., an input from the subject user, in addition to inputs from the other known individuals in the group via respective headsets and/or other devices of such known individuals). However, it should be noted that in one example, it is not necessary that the other participants be using similar devices. For instance, only the subject user may utilize the audio enhancements of the present disclosure.

In step 220, the processing system captures sensor data from at least one sensor of the user's headset or other mobile computing devices. For instance, the at least one sensor may comprise the at least one microphone of the headset. Thus, the data captured from the at least one sensor may comprise external audio data captured via the at least one microphone. In one example, the at least one sensor may further comprise at least one camera (e.g., as a component of the user's headset, affixed to the user's headset or glasses and in communication with the headset or other mobile computing devices of the user, etc.) or other imaging sensor (e.g., a LiDAR unit, a sonar unit, an infrared scanner, etc.). As such, the data captured from the at least one sensor may further comprise at least one image (e.g., a picture, or a video clip or video stream comprising a sequence of images, one or more LiDAR, sonar, or infrared scans, etc.) captured via the at least one camera or other imaging sensor(s).

In step 225, the processing system determines first audio data of at least a first audio source in the external audio data captured via the at least one microphone. In addition, in an example where the at least one sensor further comprises at least one camera or other imaging sensor, step 225 may further include determining that the first audio source is a focus of a user of the device based upon at least one image captured from the at least one camera or other imaging sensor. Similarly, in one example, the user's headset may comprise an array of directional microphones, or a directional microphone that is aligned to be front facing when the headset is worn by the user (e.g., in the same direction as the user's face/eyes point). As such, the focus of the user may be determined in accordance with external audio data alone, or audio in conjunction with image data.

In optional step 230, the processing system may determine second audio data of at least a second audio source in the external audio data captured via the microphone. For instance, step 225 and optional step 230 may comprise source/signal separation, or track separation, to distinguish different audio sources within the external audio data. In one example, the second audio data can be determined to be from a particular source or may be anything that is detected as noise, e.g., below a noise threshold. For instance, the first situational detection model may be to detect a safety message, which is volume-enhanced. However, while it may be desirable to block out all noise, it may still be desirable to allow in other human voices, such as a companion of the user saying "let's get out of here." For example, it may be preferable to not block the companion's voice in this scenario. It should be noted that in one example, the companion's voice need not be detected as such at optional step 230, but only that the voice is not detected and filtered out as noise. In one example, optional step 230 may include determining that the at least the second audio source is not a focus of the user (e.g., from image and/or audio information), or this may be inferred when the first audio source may be determined at step 225 to be the focus of the user.

In step 235, the processing system applies the at least the first audio data to at least one situational detection model, where a first situational detection model of the at least one situational detection model is to detect a respective situation based upon at least the first audio data. For instance, the at least one situational detection model may be activated at optional step 215 as discussed above. In one example, step 235 includes applying additional sensor data (e.g., additional tracks or portions of the captured external audio data, image/video data, etc.) to the at least one situational detection model. In one example, the at least one situational detection model may comprise a plurality of situational detection models, as discussed above.

In step 240, the processing system detects a first situation via a first situational detection model of the at least one situational detection model. As noted above, in one example, the first situational detection model may be to detect a voice of at least a first known individual. In another example, the first situational detection model is to detect a safety message. In one example, the first situational detection model is to detect a plurality of different safety messages based upon a plurality of characteristics shared by the plurality of different safety messages. In still another example, the first situational detection model is to detect a defined dangerous situation. In one example, the first situational detection model is to detect the first situation from at least one of the external audio data or the at least one image that may be captured at step 220. In other words, the processing system may detect the first situation from images alone or from audio alone, but the situation may be detected with highest confidence when both image/video as well as audio indicative of the situation are both present (e.g., detecting the face of a known individual in addition to his or her voice). In one example, the first situational detection model may use other sensor data as an input, or inputs, such a thermometer, or the like. For instance, where there is a defined dangerous situation of a car accident and there is significant heat, the situational detection model may be configured to determine the defined dangerous situation with even greater confidence.

In step 245, the processing system modifies, in response to detecting the first situation via the first situational detection model, the external audio data via a change to the first audio data in the external audio data to generate a modified audio data, where the modifying is in accordance with at least a first audio adjustment corresponding to the first situational detection model, where the modifying comprises increasing or decreasing a volume of the first audio data. For instance, in an example where the first situational detection model is to detect a voice of at least a first known individual, the at least the first audio source may comprise the first known individual and the first audio data may comprise a voice of the first known individual. In an example where the first situational detection model is to detect a safety message, the at least the first audio data may comprise at least a portion of the safety message. In one example, when a safety message is detected in accordance with the first situational detection model, the at least the first audio adjustment (or the detecting of the first situation) may prevent modifying of the external audio data in accordance with other situational detection models of the at least one situational detection model.

In one example, the modification to the external audio data is further applied to the external audio data from a time prior to the detecting. For instance, as noted above, at optional step 210 the processing system may record external audio data from a time prior to the detecting. Thus, for instance, a designated safety message may be detected, but a portion of the message may already have been completed by the time of the detection. Accordingly, the present disclosure may return to the recorded external audio data from prior to the time at which the designated safety message is detected, and modify this earlier external audio data for later recorded playback (e.g., at optional steps 255 and 260 as discussed below). A similar modification to earlier external audio data may also be applied in connection with other situations detected via situational detection models.

In one example, step 245 may comprise increasing the volume of the first audio data while decreasing a volume of the second audio data in the external audio data. For instance, an audio source that is determined to be a focus of the user may be enhanced, while at least a second audio source may be diminished (such as all other sounds, audio from other specific identified sources, etc.). In another example, only certain audio frequencies may be modified (such as the low-frequency rumble of a train or the high frequency tin of a whistle). In yet another example, the modification may involve a translation of the original sound to another audio sound (such as a phone ringer to a cow bell or a word "stop" in a language unknown to the user to the word "stop" in her or his native language). In another example, the adjustment(s) may be reversed, such as blocking audio from the first audio source that is focus of user. For instance, the processing system may obtain a command from the user to block/diminish audio from a particular audio source, such as looking at airplane or idling truck and then saying "block" or "audio block" as a voice command. Similarly, step 245 may comprise either enhancing or diminish the voice of at least a first known individual (e.g., the user can desire to hear the first known individual better, or may wish to tune-out the first known individual). For instance, a first spouse may be trying to have an in-person conversation with another individual, while the second spouse is nearby talking loudly on the phone. Thus, the first spouse may attempt to tune out the second spouse by activating the first situational detection model to detect the second spouse and then to tune out the second spouse via the first audio adjustment.

In one example, step 245 may also include decreasing a volume of an audio feed from the telecommunication network (e.g., streaming music, a voice call, checking voice messages, etc.) in conjunction with the adjustment of the external audio. In one example, step 245 may include modifying the first audio data (and/or second audio data), e.g., modifying a particular separated track/signal associated with the source (as may be separated at step 225 and optional step 230), and then re-combining with one or more other tracks, or component audio data from the captured external audio data. For instance, the first audio data may comprise a safety message that is enhanced to a particular volume level, while the second audio data comprising a voice of the user's companion may also be enhanced, although to a lesser volume (in one example, other sounds in the external audio data, such as background noise, train noise, etc., may also be diminished).

In step 250, the processing system presents the modified audio data via at least one earphone of the headset. For instance, the processing system may output the modified audio data for presentation via the at least one earphone. In an example where the processing system includes one or more network-based components, step 250 may comprise transmitting the modified audio data over the network(s). In one example, a modified first audio data, or track associated with the first audio source, may be provided at step 250 by the network-based components to the user's headset or other mobile computing devices. In response, the user's headset and/or other mobile computing devices may then mix the modified track back in with other tracks of the captured external audio.

In optional step 255, the processing system may obtain a replay or a rewind command. For instance, as noted above, the processing system may record the external audio data from a time prior to detecting the first situation, allowing to user to replay the recorded external audio data.

In optional step 260 the processing system may present, via the at least one earphone, the modified audio data including the modification to the external audio data from the time prior to the detecting. For instance, as noted above, the processing system may also go back to the earlier recorded external audio data to find the at the first situation is also present in the prior recording, and may then apply the modification(s) corresponding to the detected situation. As such, when the user replays the recording, the user may be presented with the modification(s) over the entire course of the situation (and not just from the instant at which the situation was first detected).

Following step 250 or optional step 260 the method 200 proceeds to step 295 where the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 220-250 for an ongoing situation, steps 220-250 for a different situation, steps 210-250 with regard to a different set of one or more active situational detection models for the user (e.g., when the user is at home versus at work, etc.). In one example, the method 200 may further include obtaining situation detection models (e.g., one or more that may be applicable to detecting known individuals who have consented to the use of their associated detection models by the user, situational detection models that are for system-wide deployment (e.g., updated dangerous situational detection models, and so forth)). Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for modifying external audio data in response to detecting a situation via a situation detection model based upon sensor data comprising the external audio data, and various input/output devices 306, e.g., a camera, a video camera, a sonar unit, a LiDAR unit, an infrared scanner, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for modifying external audio data in response to detecting a situation via a situation detection model based upon sensor data comprising the external audio data (e.g., a software program comprising computer-executable instructions) can be loaded into memory 304 and executed by hardware processor element 302 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for modifying external audio data in response to detecting a situation via a situation detection model based upon sensor data comprising the external audio data (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. An apparatus comprising:
a processing system including at least one processor; and
a computer-readable medium storing instructions which, when executed by the processing system, cause the processing system to perform operations, the operations comprising:
capturing sensor data from at least one sensor, wherein the at least one sensor comprises at least one microphone of a wearable device, and wherein the sensor data captured from the at least one sensor comprises external audio data captured via the at least one microphone;
determining first audio data of at least a first audio source in the external audio data captured via the at least one microphone;
applying at least the first audio data to at least one situational detection model, wherein a first situational detection model of the at least one situational detection model is to detect a respective situation based upon at least the first audio data;
detecting a first situation via the first situational detection model of the at least one situational detection model;
modifying, in response to the detecting the first situation via the first situational detection model, the external audio data via a change to the first audio data in the external audio data to generate a modified audio data, wherein the modifying is in accordance with at least a first audio adjustment corresponding to the first situational detection model, wherein the modifying comprises increasing or decreasing a volume of the first audio data; and
presenting the modified audio data via at least one earphone of the wearable device.

2. The apparatus of claim 1, wherein the apparatus comprises the wearable device.

3. The apparatus of claim 1, wherein the processing system is deployed in a telecommunication network.

4. The apparatus of claim 1, wherein the first situational detection model is to detect a voice of at least a first known individual, wherein the at least the first audio source comprises audio from the first known individual, wherein the first audio data comprises a voice of the first known individual.

5. The apparatus of claim 4, further comprising:
activating the first situational detection model in response to a user input.

6. The apparatus of claim 4, wherein the at least one situational detection model further comprises a second situational detection model, wherein the second situational detection model is to detect a voice of at least a second known individual.

7. The apparatus of claim 6, wherein the first known individual, the second known individual, and a user of the device are participants in a group-based communication.

8. The apparatus of claim 7, further comprising:
activating the at least one situational detection model for the group-based communication in accordance with at least one user input.

9. The apparatus of claim 1, wherein the first situational detection model is to detect a safety message, wherein the at least the first audio data comprises at least a portion of the safety message.

10. The apparatus of claim 9, wherein the first situational detection model is to detect a plurality of different safety messages based upon a plurality of characteristics shared by the plurality of different safety messages.

11. The apparatus of claim 9, wherein when the safety message is detected in accordance with the first situational detection model, the at least the first audio adjustment prevents modifying of the external audio data in accordance with other situational detection models of the at least one situational detection model.

12. The apparatus of claim 1, wherein the first situational detection model is to detect a defined dangerous situation.

13. The apparatus of claim 1, wherein the at least one sensor further comprises at least one imaging sensor, wherein the sensor data captured from the at least one sensor further comprises at least one image captured via the at least one imaging sensor.

14. The apparatus of claim 13, wherein the first situational detection model is to detect the first situation from at least one of the external audio data or the at least one image.

15. The apparatus of claim 1, further comprising:
determining second audio data of at least a second audio source in the external audio data captured via the at least one microphone, wherein the modifying the external audio data in accordance with the at least the first audio adjustment further comprises decreasing a volume of the second audio data in the external audio data, wherein the modifying comprises increasing the volume of the first audio data.

16. The apparatus of claim 15, wherein the at least one sensor further comprises at least one imaging sensor, wherein the first audio source is determined to be a focus of a user of the wearable device based upon at least one image captured from the at least one imaging sensor.

17. The apparatus of claim 1, further comprising:
recording the external audio data from a time prior to the detecting of the first situation via the first situational detection model, wherein the modifying the external audio data is further applied to the external audio data from the time prior to the detecting.

18. The apparatus of claim 17, further comprising:
obtaining a replay or a rewind command; and
presenting, via the at least one earphone, the modified audio data including a modification to the external audio data from the time prior to the detecting.

19. A non-transitory computer-readable medium storing instructions which, when executed by a processing system including at least one processor, cause the processing system to perform operations, the operations comprising:
capturing sensor data from at least one sensor, wherein the at least one sensor comprises at least one microphone of a wearable device, and wherein the sensor data captured from the at least one sensor comprises external audio data captured via the at least one microphone;
determining first audio data of at least a first audio source in the external audio data captured via the at least one microphone;
applying at least the first audio data to at least one situational detection model, wherein a first situational detection model of the at least one situational detection model is to detect a respective situation based upon at least the first audio data;
detecting a first situation via the first situational detection model of the at least one situational detection model;
modifying, in response to the detecting the first situation via the first situational detection model, the external audio data via a change to the first audio data in the external audio data to generate a modified audio data, wherein the modifying is in accordance with at least a first audio adjustment corresponding to the first situational detection model, wherein the modifying comprises increasing or decreasing a volume of the first audio data; and
presenting the modified audio data via at least one earphone of the wearable device.

20. A method comprising:
capturing, by a processing system including at least one processor, sensor data from at least one sensor, wherein the at least one sensor comprises at least one microphone of a wearable device, and wherein the sensor data captured from the at least one sensor comprises external audio data captured via the at least one microphone;
determining, by the processing system, first audio data of at least a first audio source in the external audio data captured via the at least one microphone;
applying, by the processing system, at least the first audio data to at least one situational detection model, wherein a first situational detection model of the at least one situational detection model is to detect a respective situation based upon at least the first audio data;
detecting, by the processing system, a first situation via the first situational detection model of the at least one situational detection model;
modifying, by the processing system, in response to the detecting the first situation via the first situational detection model, the external audio data via a change to the first audio data in the external audio data to generate a modified audio data, wherein the modifying is in accordance with at least a first audio adjustment corresponding to the first situational detection model, wherein the modifying comprises increasing or decreasing a volume of the first audio data; and
presenting, by the processing system, the modified audio data via at least one earphone of the wearable device.

* * * * *